United States Patent [19]

Ashford et al.

[11] 4,385,349
[45] May 24, 1983

[54] CENTRAL PROCESSOR SUPERVISED CONTROLLER SYSTEM HAVING A SIMULATION OF THE CONTROLLER IN THE CENTRAL PROCESSOR FOR TEST PURPOSES

[75] Inventors: Thomas J. Ashford; Rajan Krishnamurty, both of Austin; John A. Voltin, Round Rock, all of Tex.

[73] Assignee: International Business Machines Corporation, Armonk, N.Y.

[21] Appl. No.: 208,735

[22] Filed: Nov. 20, 1980

[51] Int. Cl.³ .................... G05B 23/02; G06F 11/00
[52] U.S. Cl. ................................ 364/184; 360/31; 364/186; 364/578; 364/474; 364/900; 371/20; 371/23
[58] Field of Search ............. 364/184, 186, 474, 578, 364/200 MS File, 900 MS File; 371/20, 23, 24, 71; 360/31

[56] References Cited

U.S. PATENT DOCUMENTS

| 3,609,312 | 9/1971 | Higgin et al. ............... 364/186 X |
| 4,115,847 | 9/1978 | Osder et al. ................ 364/186 X |
| 4,167,786 | 9/1979 | Miller et al. ................ 364/186 X |
| 4,227,244 | 10/1980 | Thorsrud et al. ............. 371/24 X |
| 4,271,513 | 6/1981 | Maejima et al. ............... 371/24 X |

OTHER PUBLICATIONS

Kulka et al-"Diagnostic Procedures"-IBM Technical Disclosure Bulletin, vol. 14, No. 9, Feb. 1972, pp. 2749, 2750.

Primary Examiner—Joseph F. Ruggiero
Attorney, Agent, or Firm—J. B. Kraft

[57] ABSTRACT

In a system for controlling a machine tool by a tool controller under the supervision of a central data processor, in which the controller transforms the data provided by the central processor into a format compatible with the machine tool, e.g., clock pulse encoded data format suitable for writing into and reading out of a serial storage magnetic memory device, a test system is provided wherein the central processor includes a simulation of the controller. This simulated controller gives the processor the capability of simulating and applying to the tool controller data in a format equivalent to that normally applied to the tool controller from the tool itself, e.g., a clock encoded data read output. The simulated controller also provides the central processor with the capability of receiving from the tool controller a tool control output in the format compatible with the control tool, e.g., clock encoded data and changing said data into an original format usable in the central processor.

3 Claims, 5 Drawing Figures

DUMP (WRITE) TEST

LOAD (READ) TEST

CENTRAL PROCESSOR SUPERVISED CONTROLLER SYSTEM HAVING A SIMULATION OF THE CONTROLLER IN THE CENTRAL PROCESSOR FOR TEST PURPOSES

BACKGROUND OF THE INVENTION

1. Field of the Invention

This invention relates to systems for controlling the operation of machine tools by machine tool controllers under the control of a central data processing unit. More particularly, the present invention relates to systems for testing the machine tool controllers.

2. Description of the Prior Art

With the ever increasing automation of industry both in manufacturing and in facilities controlling and monitoring, as well as in the ever increasing automation of many aspects of life both in business offices and in homes, there is a constant demand for means for controlling the operation of a wide variety of machine tools, many at increasing operational speeds.

With the rapid advances being made in development of the large scale integrated circuit technology, resulting in bigger, more efficient, faster and less expensive integrated circuits, there has been rapidly increasing use of machine tool controllers which are microprocessors using one or a few large scale integrated circuit chips which are substantially dedicated to the machine being controlled.

The use of such machine tool controllers over the past decade has extensively replaced or at least supplemented the more traditional approach of machine tool control involving a large capacity general purpose central processor with extensive multiplexing to control a plurality of machine tools. While such multiplexing still has its place in machine tool technology, it is usually substantially slower than systems involving the plurality of dedicated machine tool controllers supervised by a central processing unit. Thus, in control systems requiring high speeds, the use of tool controllers is increasing.

One area in central processor supervised machine tool control in which additional capabilities are needed is in the testing of the machine tool controllers, and particularly in the diagnostics involved when there has been an error or failure in a machine tool controller system. The standard approach in the failure and error diagnoses involves the testing of the combination of the machine tool controller and the machine tool itself under central processor supervision. While such approaches have been found to be reasonably effective in the communications field as in the system of U.S. Pat. No. 4,042,794 for example, this approach has been less than completely desirable in machine tool controller systems. In testing the latter it is often difficult and expensive to isolate whether the failure has occurred in the machine tool itself or in the machine tool controller. This is particularly true when the machine tool controller performs complex transformation on the data provided to the controller from the central processor, e.g., the inclusion of clock pulses or other forms of encoding/decoding functions or even transformations, required for multiplexing or demultiplexing in order to make the data compatible with the machine tool itself. Likewise, in such a case, the controller would perform functions such as the separation of clock pulses or other decoding as well as demultiplexing on data received from the machine tool.

One approach towards a solution of this problem would be the extensive incorporation of sufficient hardware in the tool controller to perform diagnostics on the tool controller with a minimal intervention of the central processor. This approach has been used extensively only in cases where both read and write hardware are used in the "normal" mode. The duplicate hardware is justified by something other than diagnostic purposes (such as for full duplex communications). This follows because the need for the additional hardware substantially increases tool controller cost. U.S. Pat. No. 3,889,109 describes this type of configuration.

SUMMARY OF THE PRESENT INVENTION

The present invention provides a solution to the problem of testing the tool controller independently of the machine tool being controlled. The expedient of the present invention is relatively inexpensive, requiring very little additional hardware in the tool controller. In addition, because the testing is carried out isolated from the machine tool itself, isolation of failures and errors in the controller is greatly facilitated.

In accordance with the present invention, the central processor which in operation supervises the machine tool controller in its controlling of the tool, contains a simulation of at least a substantial portion of the machine tool controller. This simulation is not involved in the normal operation of the system when the tool controller is operational to control the machine tool. Rather, the simulated tool controller functions during testing and failure diagnostics which are usually carried out by the central processor in combination with the tool controller with the machine tool disconnected or isolated from the testing system.

In its broadest aspects, the present invention provides an improvement for the testing of operability of rather complicated machine tool controller systems wherein the controller includes means for transforming data having an initial format provided to the controller from the central processor into a more complex format which is compatible with the machine tool. This more complex transformed format may include encoding and decoding as well as multiplexing of data. Of course, the controller must also include means for retransforming the transformed data output from the machine tool into the initial data format so it may be provided back to the central processor.

In the present invention, the central data processor includes means for testing the responsiveness of the machine tool controller comprising a simulation of the controller, means including the simulated controller, for simulating transformed machine tool data output and for applying the output to the tool controller, and means respnsive to the retransformed data output of said tool controller applied back to the central processor in response to the simulated data for determining operability of the controller. For the testing of what is substantially the reverse condition, i.e., the ability of the controller to transform data, the cental processor further includes means for applying untransformed or initial commands to the controller coupled with means for applying the transformed control output of the controller in response to these commands back to the central processor, and means in the central processor including the simulated controller for retransforming the fed back tool control output into the initial data format so that the central processor can determine the operability of the tool controller.

In accordance with a more particular aspect of the present invention, the machine tool being controlled by the tool controller is a serial storage magnetic media memory device and the transformation of the data so it will be compatible with the memory device carried out in the tool controller involves the encoding of clock data into the initial data provided by the central processor. Consequently, the retransformation will involve the removal of the encoded clock data.

BRIEF DESCRIPTION OF THE DRAWINGS

Referring now to the drawings, wherein a preferred embodiment of the invention is illustrated, and wherein like reference numerals are used throughout the designate like parts.

DETAILED DESCRIPTION OF THE PREFERRED EMBODIMENT

Figure 1:
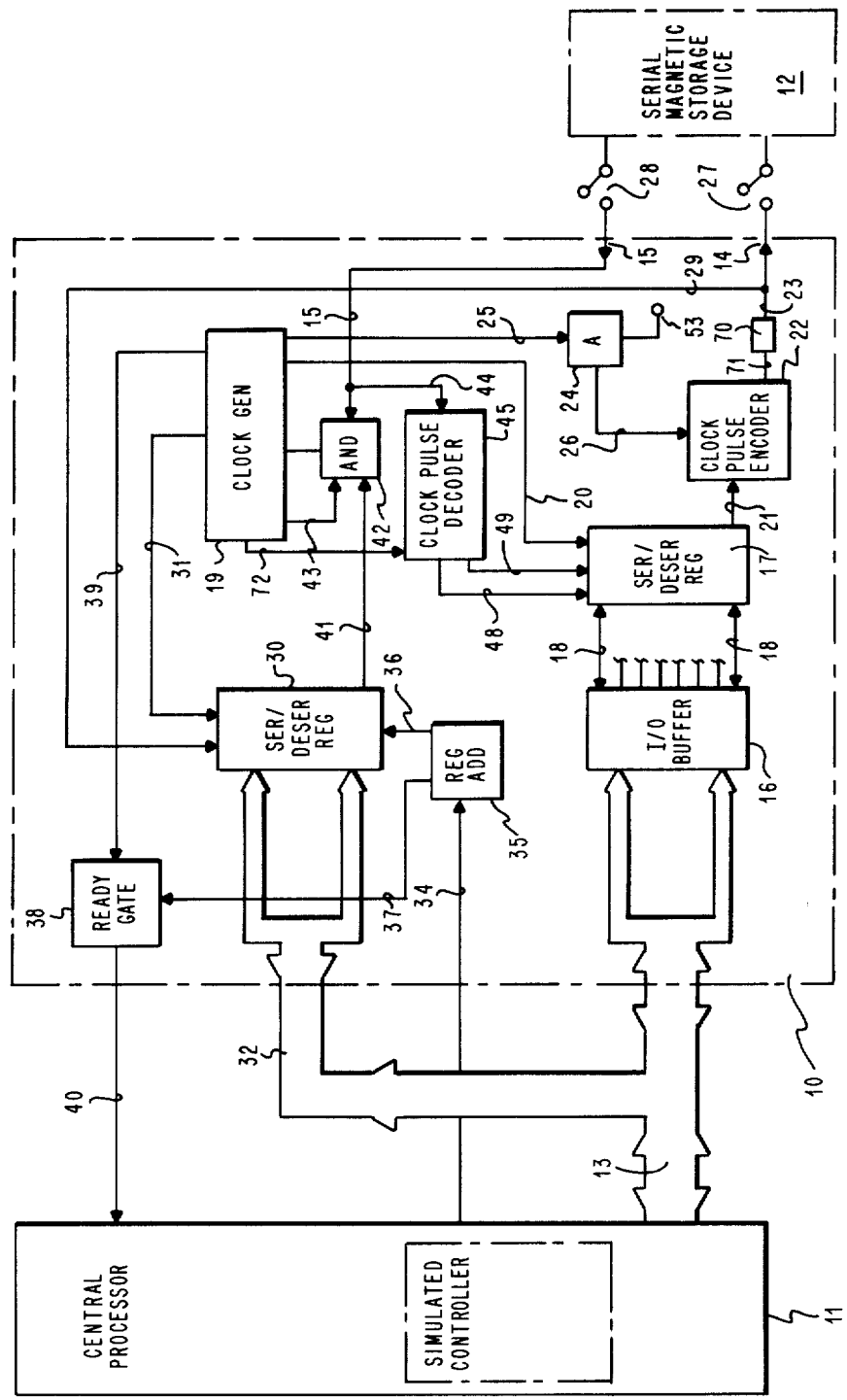
FIG. 1 is a logic diagram showing the detail of a tool controller function for encoding and decoding clock data for the I/O interface with a conventional serial magnetic storage device such as a magnetic medium memory diskette, as well as the relationship of the tool controller with the supervising central processor.

While the present invention relates to the testing of machine tool controllers in general, it will be particularly described with respect to the testing of a tool controller which controls a serial storage magnetic medium memory device such as a magnetic memory tape storage device described in U.S. Pat. Nos. 3,753,239 and 3,781,813 or for a flexible magnetic diskette type of storage device such as that described in U.S. Pat. No. 4,089,029 and 3,678,481. With reference to FIG. 1, tool controller 10 under the supervision of central processor 11 will in normal operation provide the input which will activate or drive the various functions of magnetic medium storage device 12. In normal operations, the controller 10 will receive data from central processor 11 over I/O buss 13. Among its other functions, the tool controller will condition or transform this data into a format which is utilizable by the serial magnetic storage device 12.

While it will be understood by those skilled in the art, the tool controller 10 may perform other functions with respect to the control of the serial magnetic storage device 12, for purposes of illustrating the test system of this invention, we will consider the testing of the operability of controller 10 carrying out its normal function of encoding clock data into non-coded initial data provided by central processor 11 over buss 13 and applying this clock encoded data along line 14 to serial storage device 12. The present illustration will also consider the testing of the operability of tool controller 10 in receiving and decoding clock encoded output data provided by serial storage device 12 on line 15 and outputting resulting non-coded data to central processor 11 back over buss 13.

Figure 4:
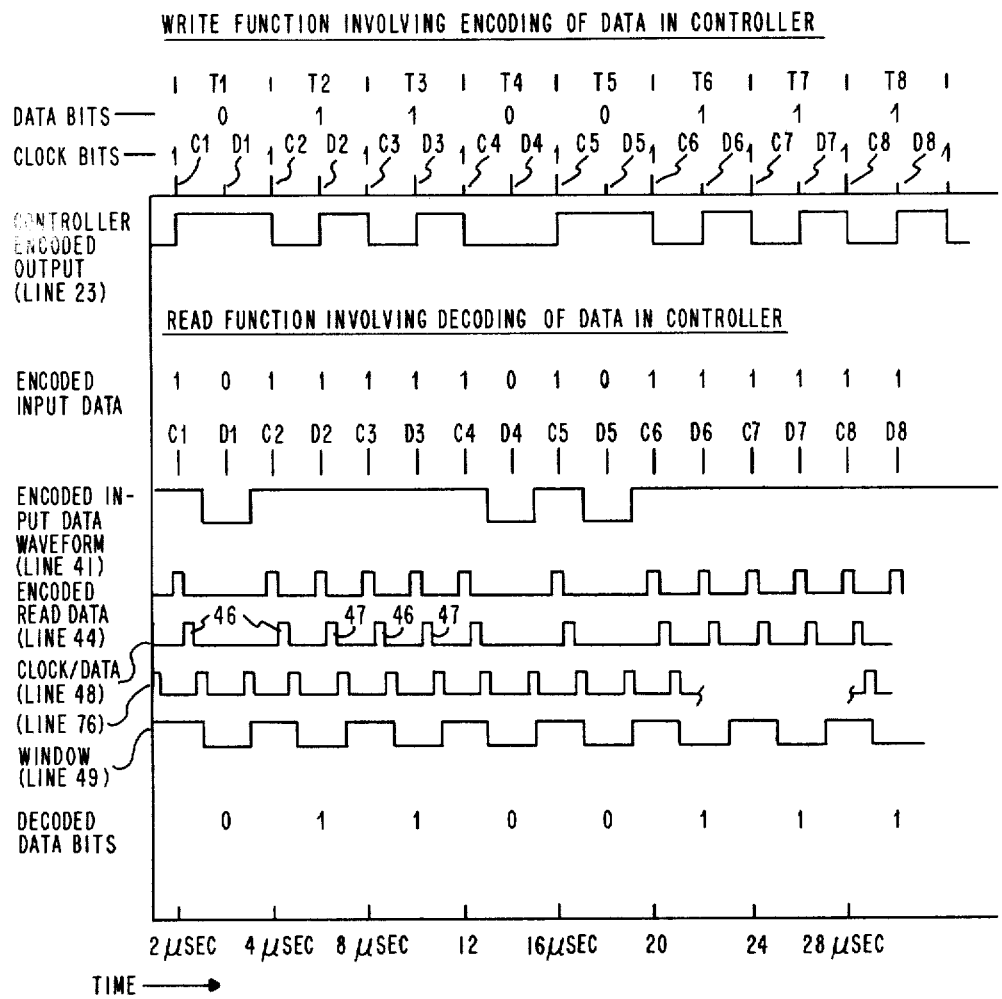
FIG. 4 is a timing chart illustrating pulse levels at various times on various busses and lines in FIG. 1 and in flow chart stages in FIGS. 2 and 3 during the controller testing procedures described hereinafter.

Now with respect to FIG. 1 and the timing charts of FIG. 4, let us consider controller test operation of the present invention. The first operation to be tested will be a write operation; during this operation, central processor 11 will provide a sequence of one byte increments of unencoded write data into I/O buffer 16 of controller 10. These eight bit parallel increments will be shifted in parallel to serializer/deserializer register 17 along parallel lines 18 as needed as each succeeding byte is passed out in serial form from register 17.

Let us follow through with one byte of unencoded data fed along buss 13 into I/O register 16. To illustrate, assume the byte is: 01100111. Then, under the control of clock generator 19 which provides control pulses along line 20 to serializer/deserializer register 17 at, for example, four microsecond intervals to provide a serial output of the above byte of data on line 21 where each data bit is separated from its adjacent data bit by a four microsecond interval. With reference to the timing chart of FIG. 4, serial data bits 01100111 are input to clock pulse encoder 22 respectively at time points D1-D8 each respectively within time intervals T1-T8.

For this illustration, let us assume that clock bits 11111111 are to be encoded to be above eight data bits, i.e., interleaved so that each data bit is separated by a clock bit. The sequence of the eight clock bits may be conveniently applied through terminal 53 of AND gate 24 synchronized with a second input to AND gate 24 along line 25 from clock generator 19 which provides a sequence of eight clock pulses at four microsecond interval time points designated at C1-C8 in the timing chart of FIG. 4. At each of time points C1-C8 there is a coincident clock bit on terminal 53, a pulse output will be provided on line 26 from gate 24 to clock pulse encoder 22.

It should be noted that the clock input to clock pulse encoder 22 along line 26 is determined by input to AND gate 24 on terminal 53 since the input along line 25 to AND gate 24 is a four microsecond interval pulse train. Timing chart illustration on FIG. 4 of the clock bits indicates a string of all "ones" which is the customary situation wherein the clock pulse is always present. However, there may be some circumstances wherein it would be required to have the absence of one or more clock pulses and this would be controlled by having one or more "zero" bits in the sequence applied to terminal 23.

Clock pulse encoder 22 which may be any conventional circuit for alternately interleaving clock pulses with data pulses to produce a pulse train on line 71 wherein the presence or absence of data pulses at each alternate 2 microsecond position D1–D8, (FIG. 4) indicates the presence or absence of a data bit, and the presence or absence of clock pulses at each alternate 2 microsecond position C1–C8 indicates that presence or absence of a clock bit. Each occurrence of a pulse on line 71 causes bistable data latch 70 to change state so as to produce the controller encoded output on line 23 as indicated in the timing chart of FIG. 4.

In any event, for the string of 8 clock bits to be encoded into the string of eight data bits shown in FIG. 4, a controller encoded output on line 23 would have the form shown in FIG. 4. For every two microsecond time points, C1,D1,C2,D2,C3 . . . D7,C8 and D9 if the data or alternate clock bit is "one" there will be a transition in the wave form; if the clock bit is "zero", there will be no transition in the wave form. To illustrate, since the clock bits are all "ones", there is a transition at each of the clock bit points C1–C8. However, since the data bits at points D1,D4 and D5 are "zeros" there is no transition in the output wave form at these points. If the controller 10 were in the operational rather than in the present testing mode, the controller encoded output shown in FIG. 4 would be applied along line 14 to an input to serial magnetic storage device 12. However, during this testing mode, the serial magnetic storage device is detached or isolated from controller 10 as illustrated by switches 27 and 28 being open. This encoded output is applied through line 29 to encoded data serializer/deserializer register 30 which is a shift register under the control of clock generator 19. Through line clock generator 31, the clock encoded data along line 29 is shifted in one bit at a time to form parallel bytes of encoded data which will be output back to central processor 11 along I/O buss 32 connecting with I/O buss 13.

It should be noted that serializer/deserializer register in addition to serving the function of deserializing serial encoded data to be sent back to the central processor 11 as described above, also serves the function of serializing parallel encoded data being applied from the central processor 11 to controller 10 along line 32 as will be hereinafter described during the testing of a controller decoding or read operation. The mode in which the serializer/deserializer register 30 operates is determined by the input from central processor 11 along line 34 to register address means 35. The output of register address means 35 to the serializer/deserializer 30 on line 36 will determine whether register 30 is operating in a serializing or deserializing mode.

In any event, for the operation being described wherein the serial encoded data is being loaded along line 29 into register 30, register 30 is operating in the deserializing mode. This deserializing mode wherein the encoded data from register 30 is to be outputted in parallel form back to the central processor is known as a "dump". When operating in this mode, the apparatus must insure that a full byte or eight bits of data and clock information is loaded in the serializing register 30 before the byte is returned to the central processor. Accordingly, during such a "dump" operation, the register address means 35 provide an inhibit output along line 37 to READY gate 38. When thus inhibited, READY gate 38 can only be released by an input along line 39 from clock generator 19. Clock generator 19 produces one output pulse along line 39 for every eight stepping pulses which it outputs along line 31 as previously described to step the eight bits of encoded data on line 29 into register 30. Thus, the output on line 39 to READY gate 38 indicates that eight bits have been loaded and are ready in register 30 at which point READY gate 38 sends a ready signal along line 40 back to central processor 11 which now completes the sequence and receives the parallel byte of data through busses 12 and 13. This procedure is continued until all of the bytes of encoded data produced by clock pulse encoder 22 in response to the non-coded data input from central processor 11 initially applied to I/O buffer 16 of controller 10 has been output back to the central processor 11 in encoded form through register 30.

The central processor will now proceed to decode clock encoded data which a controller has provided back to the central processor and to compare the decoded data with the original non-encoded data which the central processor initially input into the controller. By this expedient, the central processor will determine the operability of the controller in its encoding function and thus test that function of the controller. As will be subsequently described in greater detail, the central processor may be any available program general purpose central processor such as the IBM 370 CPU or it may be any standard general purpose microprocessor such as the Intel 8086.

In accordance with the present invention, the decode function carried out by the central processor is in effect a programmed central processor simulation of the clock pulse decode operation and hardware in controller 10 which will subsequently be described in greater detail.

Now with respect to FIG. 1 and the timing charts of FIG. 4, let us consider a second operation which will be tested, i.e., the read operation, during this operation, the central processor will provide a sequence of one byte increments of clock encoded data to serializer/deserializer register 30. Let us follow through with two bytes of such clock encoded data which is fed from the central processor along busses 13 and 32 into register 30. To illustrate, assume that the two bytes are: 10111110; and 10111111. Since the 16 bits in these two bytes contain alternate encoded clock bits, 16 bits should yield 8 bits or one byte of data when eventually decoded.

It should be noted that in sequencing bytes of parallel data into serializer/deserializer 30, the register address means 35 coacts wih the READY gate 38 in a manner similar to that previously described for outputting encoded data from register 30 back to the central processor 11. Consequently, central processor 11 sends a signal along line 34 to address means 35 which puts register 30 in the serializing mode. This serializing mode, wherein encoded data from central processor 11 is loaded one byte at a time into register 30 in which each byte is serialized and output on line 41, is known as the "load" mode. When operating in this "load" mode, in order for the apparatus to insure that the byte of data loaded into register 30 is completely serialized and output on line 41 before the next byte is loaded, register address means 35 provide an inhibit input signal along line 37 to READY gate 38. When thus inhibited, READY gate 38 can only be released by an input along line 39 from clock generator 19. Clock generator 19 controls the serializing operation in register 30 by providing stepping pulse to register 30 along line 31 to serially step the bits out of register 30 onto line 41 at two microsecond intervals. Clock generator 19 produces one output pulse along line 39 to READY gate 38 for each 8 stepping pulses which it outputs along line 31. Thus, the output on line 39 to READY gate 38 indicates that the eight bits which had been loaded into register 30 are now stepped out of the register and register 30 is empty. At this point, READY gate 38 sends a READY signal along line 40 back to central processor 11 which now loads the next parallel byte of data into register 30 through busses 13 and 32. This procedure is continued until all the bytes of encoded data which were to be loaded into register 30 for purposes of the testing procedure have been loaded and serialized.

With reference to the timing chart of FIG. 4, the "Encoded Input Data" sets forth the two bytes of serialized data being input to AND gate 42 along line 41. This "Encoded Input Data" has the wave form shown in the timing chart of FIG. 4.

In these two bytes, clock bits at time points C1-C8 are encoded between data bits at time points D1-D8. This input is ANDED with a two microsecond interval pulse input to AND gate 42 along line 43 from clock generator 19 to provide the "Encoded Read Data" wave form shown in FIG. 4 which would be the equivalent of a typical wave form input to the controller along line 15 from the serial magnetic storage device 12 if that storage device were operational, i.e., connected.

The encoded read data output from AND gate 42 is then applied to clock pulse decoder 45 by means of line 44. Clock pulse decoder 45 distinguishes the clock pulse from the data and provides an output on line 49 which is in effect a clock window wave form as shown in FIG. 4. This clock window wave form has an elevated two microsecond interval corresponding to each clock pulse and alternating two microsecond lower or depressed level corresponding to each of the data points D1-D8. The decoder also provides an output on line 48 having a series of clock pulses 46 corresponding to encoder clock bits and data pulses 47 corresponding to the data bits.

Figure 5:
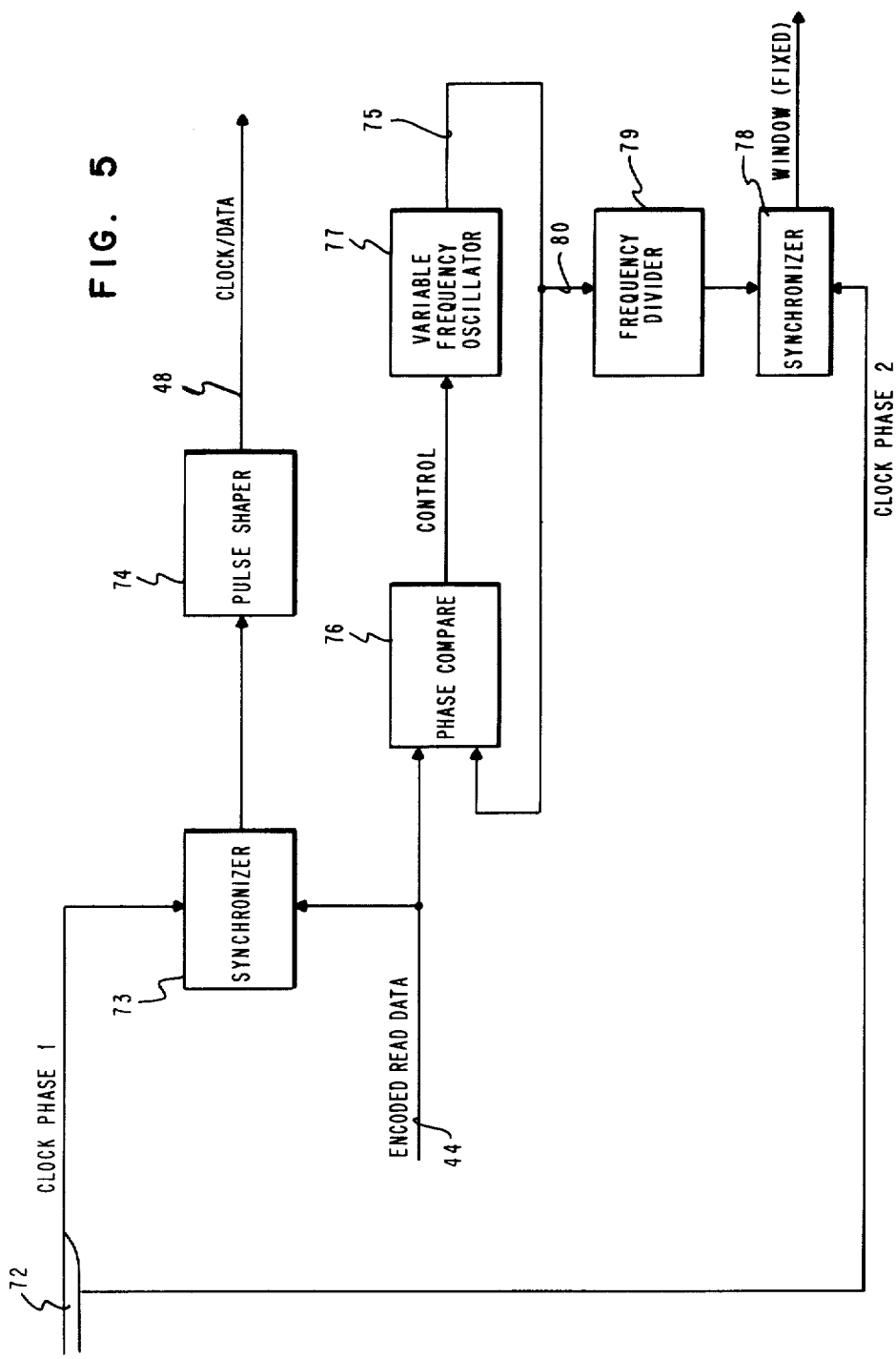
FIG. 5 is a logic diagram showing the details of a typical clock pulse decoder circuit which may be used for the circuit 45 of FIG. 1.

Clock pulse decoder circuit 45 may be implemented with conventional circuit logic as shown in FIG. 5. Outputs on output lines 48 and 49 as well as the encoded read data input on line 44 have the wave forms already described and shown with respect to FIG. 4. The outputs are synchronized under the control of selected fixed clock phase (timing) pulses obtained from clock generator 19 (FIG. 1) over bus 72. Now with reference to FIG. 5, the encoded read data on line 44 is applied to a synchronizer 73 which synchronizes the clock and data pulses under the control of a first clock (timing) phase obtained through buss 72. The output of synchronizer 73 is applied to pulse shaping circuit 74 which outputs the encoded clock and data pulses having the wave form shown in FIG. 4 on line 48.

The encoded read data input on line 44 is also applied to the circuit including a phase comparator circuit 76 which controls a variable frequency oscillator 77 through feedback on line 75 so that an output signal is provided on line 80 which has a fixed frequency which for the present case provides pulses at two microsecond time intervals as shown in the timing chart of FIG. 4. The output on line 80 is then applied to a frequency divider circuit 79 which functions to divide the frequency of the pulse train by two. The output of frequency divider 79 is synchronized in synchronizer circuit 78 with a second clock (timing) phase from clock generator over buss 72 to provide the synchronized fixed window on line 49 as previously described and shown in the timing chart of FIG. 4.

The outputs on lines 48 and 49 are fed to serializer/deserializer register 17 which is functioning in its deserializing mode. Deserializer 17 functions so that it only samples for the presence or absence of a pulse on line 48 during the window or low portion of the wave form input on line 49. Thus, only the absence or presence of data "one" bits will be determined in deserializer register 17, and if a pulse 47 is not present on input line 48 in coincidence with a window on line 49, then a "zero" will be loaded into the register of deserializer 17. On the other hand, if a pulse 47 is present on line 48 in coincidence with the presence of a window on line 49, then a "one" will be loaded into the register 17. Based upon the inputs shown in the timing chart of FIG. 4 on lines 48 and 49, the eight decoded data bits will have the sequence 01100111.

The byte of deserialized data will then be transferred along lines 18 back to I/O buffer 16 from which each byte of decoded data will be input into central processor 11 through data buss 13.

The central processor will now proceed to re-encode decoded data which the controller has provided and to compare this re-encoded data with the original encoded data which the central processor input into the controller for this functional test. By this expedient, the central processor will determine the operability of the controller in its decoding function and thus test that function for the controller. This re-encoding function which is carried out by the central processor is in effect a programmed central processor simulation of the pulse encoding operation and hardware in controller 10 which has been previously described in detail.

Figure 2:
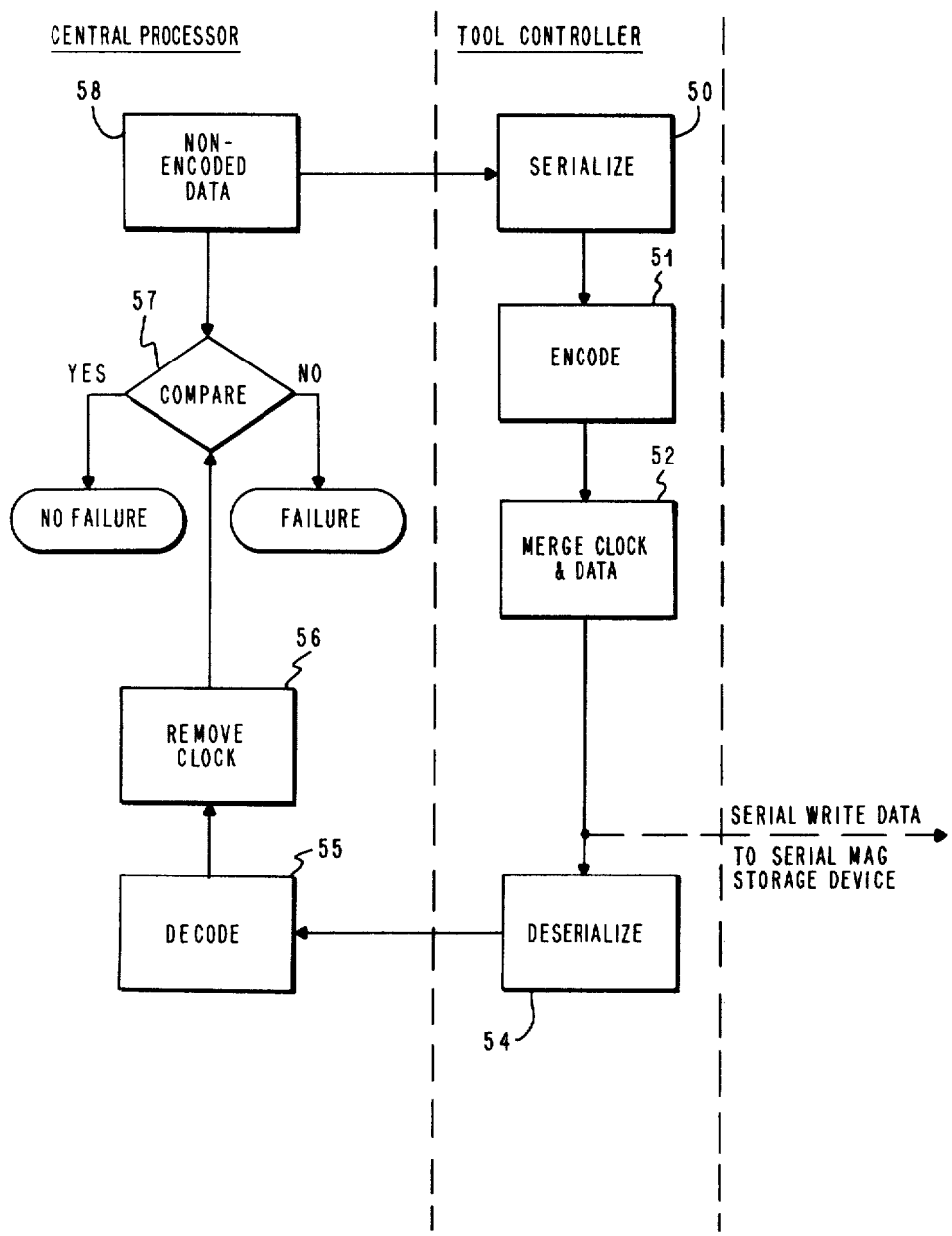
FIG. 2 is a flow chart showing both the central processor and tool controller operations during a test cycle wherein the central processor provides non-encoded data to the tool controller and the tool controller encodes the data with clock data in a conventional operational cycle which would normally provide an output to the magnetic memory diskette and the central processor decodes the encoded data fed back to it and thus determines the operability of the tool controller in this function.

Now that the functions of the various elements of tool controller 10 coacting with central processor 11 in the testing of the serial write and read operability of controller 10 have been described, we will proceed through the sequence of data processing steps in the controller and in the central processor during the testing of the "write" function of the controller involving encoding of clock bits and the "read" function of the controller involving the decoding of clock bits. Referring to the data processing flow chart of the write functional test shown in FIG. 2 utilizing the apparatus shown in FIG. 1, non-encoded data is serialized, block 50. This is the operation wherein non-encoded data is provided to controller 10 on buss 13 and proceeds through the I/O buffer 16 and the serializer register 17 as previously described to provide a non-encoded serial output on line 21. Then, block 51, data bits are encoded; this involves the operation of the clock pulse encoder 22 wherein a data "one" is represented by the presence of a narrow pulse. Next, block 52, clock and data bits are merged. This covers the merger of the data bits being applied along line 21 of FIG. 1 with the selected clock bit input being applied to terminal 23 of AND gate 24. The pattern of clock bits applied to terminal 23 determines the clock bit input to clock pulse encoder 22 along line 26 as previously described.

The encoded timed data after the operation set forth in blocks 51 and 52 is the controller encoder output on line 23, the wave form of which is shown in the timing chart of FIG. 4. This is the wave form which during normal operations would be sent to the serial magnetic storage device if it were attached. This is indicated by the dashed output line in FIG. 2. However, as previously described, during a test operation, the magnetic serial storage device is isolated from the tool controller. Consequently, at this point, block 54, the encoded data is deserialized; this covers the operation previously described as carried out by serializer/deserializer 30 on the encoded data applied to it via line 29. As previously described, the deserialized clock bit encoded data from register 30 is applied to the central processor via busses 32 and 13.

At this point, the central processor decodes (block 55) the data which has been encoded in the tool controller and removes the encoded clock pulses therefrom, block 56. In carrying out the functions of decoding and removal of clock pulses, central processor 11 is in effect programmed with operations which involve processor simulations of a clock pulse decoder 45 coupled to the serializer/deserializer 17 through outputs 49 in the hardware of FIG. 1. In any event, after the data has been decoded, the central processor compares, block 57, this data with a stored representation of the original non-encoded data, block 58, which was initially provided to the tool controller for encoding. If the data compares, this indicates that there is no failure in tool controller encoding hardware. If the data fails to compare, this normally indicates a failure in the tool controller encoding hardware.

Figure 3:
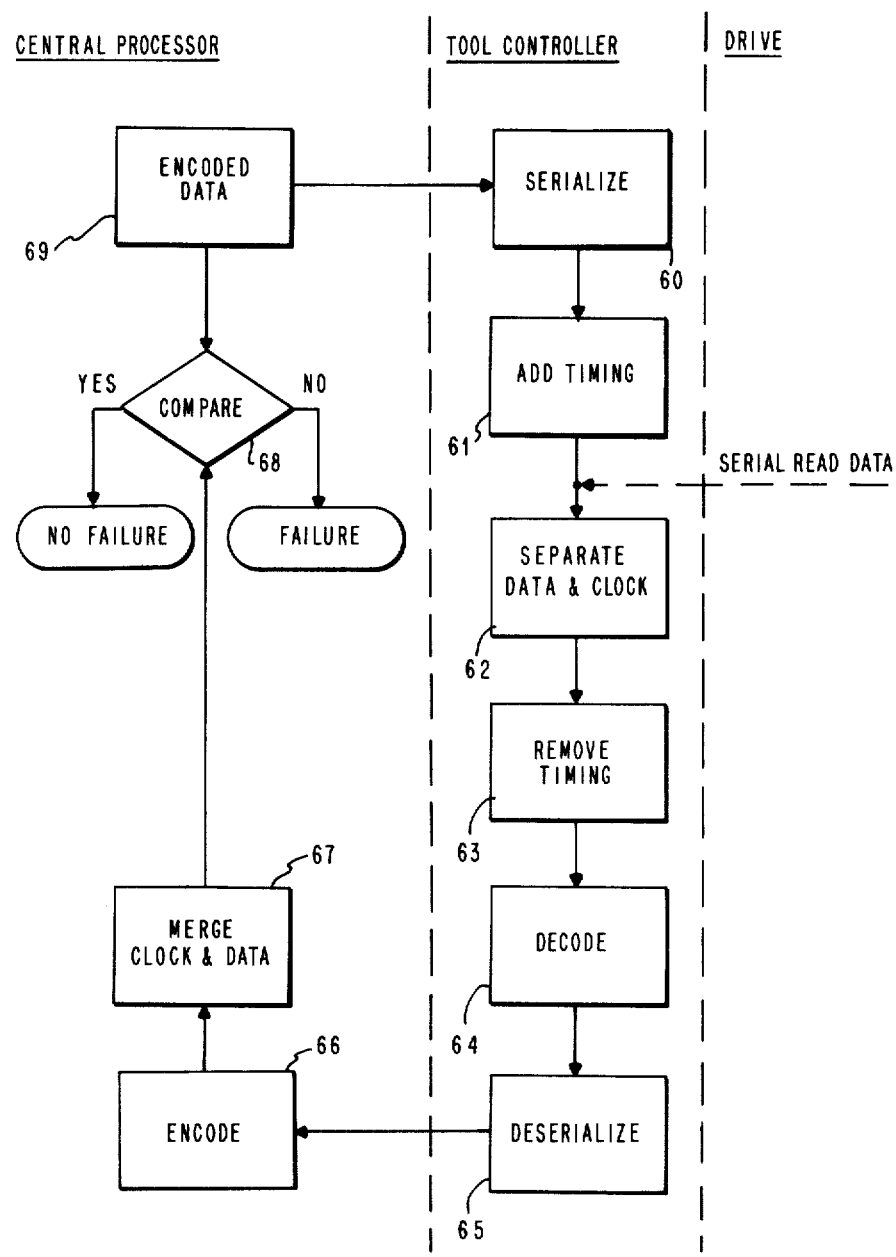
FIG. 3 is a flow chart of the tool controller and central processor operations during a tool controller test procedure wherein the central processor provides clock encoded data to the tool controller which is a simulation of encoded data normally read from magnetic memory diskette which the tool controller decodes and feeds back to the central processor which in turn determines the operability of the tool controller from the fed back data.

Similarly, let us proceed through the sequence of data processing steps in the controller and in the central processor during the testing of the "read" function of the controller involving the decoding of clock bits. Referring to the data processing flow chart of the "read" functional test shown in FIG. 3 utilizing the apparatus shown in FIG. 1, encoded data provided from the central processor is first serialized, block 60. This is the operation wherein encoded data is provided to controller 10 on busses 13 and 32 and proceeds through the serializer/deserializer register as previously described to provide an encoded serial output on line 41 which is shown in the timing chart of FIG. 4. Then, block 61, timing is provided. This describes the function of the AND gate 42 which has been previously described as combining the input along line 41 with the clock input along line 43 to provide an output on line 44 equivalent in format to any read data output which would have come from the serial magnetic storage device into the controller on line 15 if that serial storage device had been connected and operational. The wave form for this encoder read data on line 44 is shown in FIG. 4. Then, block 62, the clock bits and the data bits are separated, block 63, the timing is removed and, block 64, the data bit decoded from clock bits. This describes the previously described function carried out by the clock pulse decoder 45 and the serializer/deserializer register 17 based upon the inputs to this register from the decoder on lines 48 and 49.

At this point, the decoded data is deserialized, block 65, and output back to the central processor 11. This block covers the action of the serializer/deserializer register 17 through output buffer 16 which provides bytes of parallel decoded data back to central processor 11 along buss 13. Then, block 66, the central processor encodes the data which has been decoded into controller 10 and merges clock bits with data bits, block 67. In carrying out the functions of encoding and the merger of clock bits with data bits, the central processor is in effect programmed with the operations which involve processor simulation of clock pulse encoder 22 together with AND gate 24 in the hardware of FIG. 1. In any event, after the data has been encoded, the central processor compares, block 68, this data with a stored representation of the original encoded data, block 69, which was initially provided to the tool controller for decoding. If the data compares, this indicates that there is no failure in the tool controller decoding hardware. If the data fails to compare, this indicates a failure in the tool controller decoding hardware.

While the invention has been particularly shown and described with reference to a preferred embodiment it will be understood by those skilled in the art that various other changes in form and detail may be made without departing from the spirit and scope of the invention.

What is claimed is:

1. In a system for the recording of data in a serial storage magnetic medium memory device comprising a central processor for controlling the recording of said data in said memory and a serial magnetic memory controller responsive to commands from said central processor for controlling the serial reading of data from and the serial writing of data into said storage device, the improvement wherein the system includes means independent of said serial storage device for testing the responsiveness of the controller in said writing and reading of data comprising means in said central processor for simulating storage device serial read data including encoded clock data and for applying said data to said controller, means for applying the outputs of said controller in response to said simulated read data back to said central processor means in said central processor for applying simulated write commands to said controller means for applying the serial write output of said controller in response to said write commands back to said central processor, means in said controller for encoding clock data into said serial write output, and means in said central processor responsive to said controller outputs applied back to said processor for determining said controller responsiveness.

2. The system of claim 1 wherein the interface between said central processor and said controller is a multi-channel buss providing a parallel interface, and said means for simulating the storage device lead data include parallel to serial converter means within said controller to which said central processor applies simulated data in parallel form which said converter converts into said serial data.

3. The system of claim 2 wherein said means for applying the output of said controller back to said central processor includes a serial to parallel converter comprising a serial register having a plurality of bit positions each respectively connected to one of the channels in said multi-channel buss, and means for passing said controller output through said serial register wherein said output is converted to a parallel output back to said central processor along said multi-channel buss.

* * * * *

UNITED STATES PATENT AND TRADEMARK OFFICE
CERTIFICATE OF CORRECTION

PATENT NO. : 4,385,349
DATED : 24 May 1983
INVENTOR(S) : T. J. Ashford, R. Krishnamurty and J. A. Voltin It is certified that error appears in the above-identified patent and that said Letters Patent are hereby corrected as shown below:

Col. 10, line 46, delete "lead" and substitute --read--.

Signed and Sealed this

Sixteenth Day of August 1983

[SEAL]

Attest:

Attesting Officer

GERALD J. MOSSINGHOFF
Commissioner of Patents and Trademarks